(12) United States Patent
Morgan

(10) Patent No.: US 6,716,348 B1
(45) Date of Patent: Apr. 6, 2004

(54) QUICK CLOSE FILTER

(76) Inventor: Howard W. Morgan, 100 Anchor Rd., P.O. Box 735, Michigan City, IN (US) 46361

( * ) Notice: Subject to any disclaimer, the term of this patent is extended or adjusted under 35 U.S.C. 154(b) by 0 days.

(21) Appl. No.: 10/282,222

(22) Filed: Oct. 29, 2002

(51) Int. Cl.⁷ .................. B01D 27/08; B01D 29/27; B01D 35/30
(52) U.S. Cl. .................. 210/232; 210/238; 210/91; 210/450
(58) Field of Search .................. 210/232, 238, 210/91, 450

(56) References Cited

U.S. PATENT DOCUMENTS

| | | | |
|---|---|---|---|
| 4,420,396 A | * | 12/1983 | Yamamoto et al. |
| 4,495,072 A | * | 1/1985 | Fields |
| 5,510,031 A | * | 4/1996 | Knauf, Jr. et al. |
| 5,624,559 A | * | 4/1997 | Levin et al. |
| 5,876,600 A | * | 3/1999 | Matsubara et al. |

FOREIGN PATENT DOCUMENTS

JP 09-267005 * 10/1997

* cited by examiner

Primary Examiner—Thomas M. Lithgow
(74) Attorney, Agent, or Firm—Botkin & Hall, LLP

(57) ABSTRACT

This invention relates to a liquid filter which includes a housing and a rotatable lid for covering the opening in the filter housing. The housing incorporates the inlet port and the outlet port for the filter. The lid is secured to the housing by rotating movement in which cam followers carried by the lid engage cam members carried by the housing to cause the lid to be cammed downwardly upon the housing. As the lid is drawn down onto the housing, an annular seal carried by the lid engages the inner surface of the housing to form a seal between the lid and the housing, covering a side opening in the housing.

3 Claims, 9 Drawing Sheets

QUICK CLOSE FILTER

CROSS-REFERENCE TO RELATED APPLICATION

This is a continuation of application Ser. No. 60/348,704 filed Oct. 22, 2001.

SUMMARY OF THE INVENTION

This invention relates to a liquid filter and will have particular application to a liquid filter having a lid which is securable to the filter housing by rotative movement.

The filter lid includes follower members which, when the lid is placed upon the housing over the opening into the housing, engage caming members carried by the housing. Upon rotative movement of the lid relative to the housing, the lid is drawn downwardly upon the housing causing a seal carried by the lid to engage the inner surface of the housing. A small opening is formed in the side wall of the housing which is covered by the seal when the lid is fully turned onto the housing. This small opening serves as a safety feature indicating to the user of the filter that the lid is in its fully sealed relationship relative to the housing as the side wall opening will be sealed and no liquid will escape from the filter upon its pressurization . Should the lid not be in its fully sealed position, the small opening in the filter sidewall will not be covered by the seal and thus liquid will leak from the filter indicating to the filter user that lid is not fully seated.

The inner surface of the filter housing has an initial taper which when the lid is first placed upon the housing is engaged by the seal carried by the lid. As the lid is rotated and cammed downwardly relative to the housing, the seal is squeezed over this taper and into full sealing engagement with the remaining portion of the inner side wall of the housing, thus forming a complete liquid seal between the lid and the housing. Additionally, the camming members carried by the housing are notched so that as the lid follower members slide over the housing camming members they will slide under the notched portion of the follower members to provide a safety locking detent for the lid when the filter is pressurized.

Accordingly, it is an object of this invention to provide a liquid filter having a quick close lid.

Another object of this invention is to provide a filter which is for liquids and which includes a rotatable interlocking lid which causes a seal to engage the inner surface of the filter housing to seal the housing.

A further object of this invention is to provide a liquid filter having a housing and a rotatable cam fitting lid which carries a seal, with the seal serving to cover and close a side opening in the housing when the lid is fully seated upon the housing.

Other objects of this invention will become apparent upon a reading the following description.

BRIEF DESCRIPTION OF THE DRAWINGS

A preferred embodiment has been chosen for purposes of illustration and description.

DESCRIPTION OF THE PREFERRED EMBODIMENT

Figure 1:
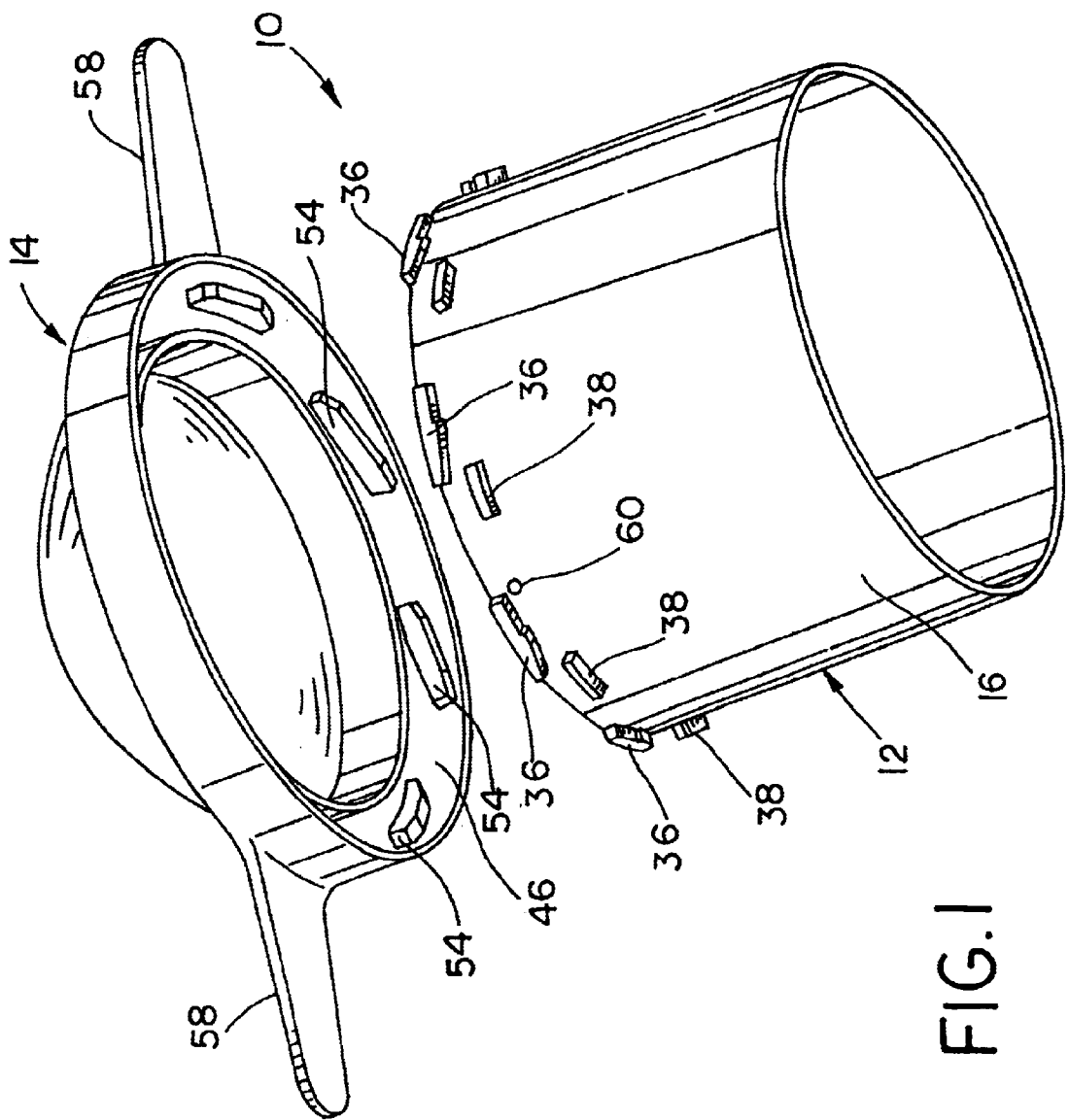
FIG. 1 is a perspective view of the filter of this invention in which the filter housing is shown in fragmented form for purposes of illustration.
Figure 2:
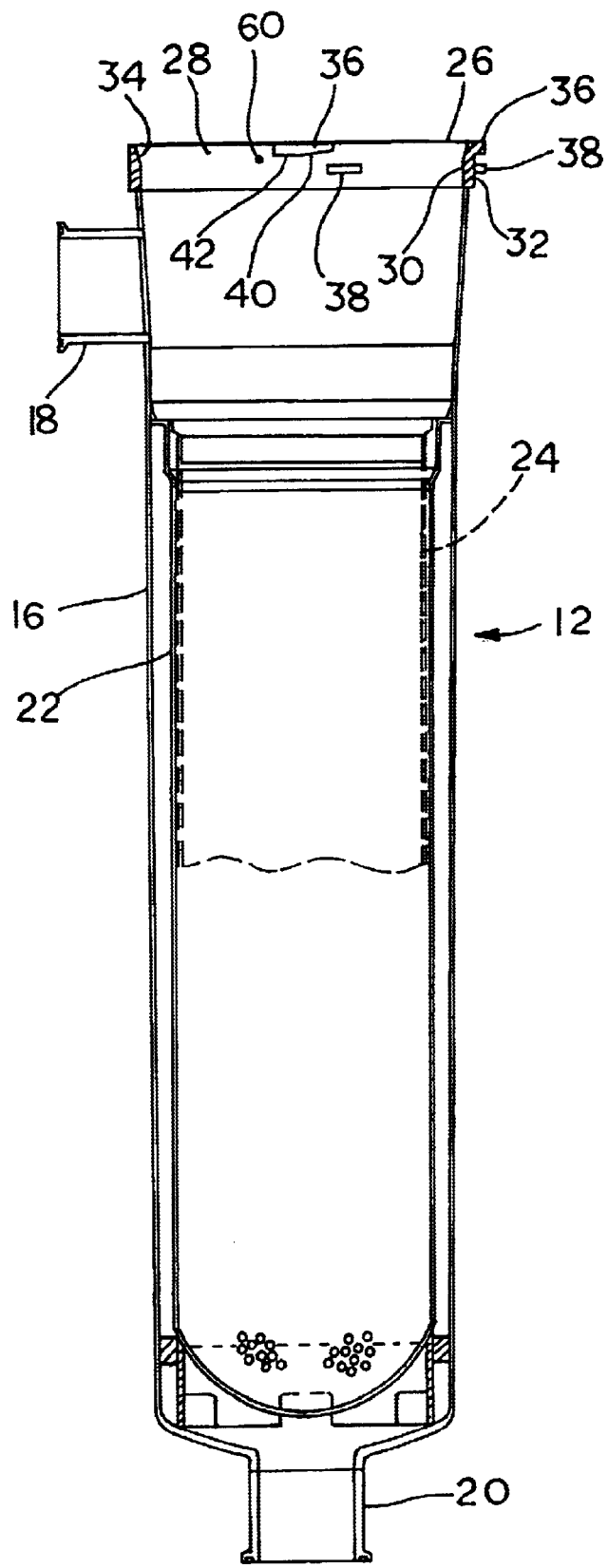
FIG. 2 is a sectional view of the filter housing showing the filter bag and basket fitted in the housing.
Figure 3:
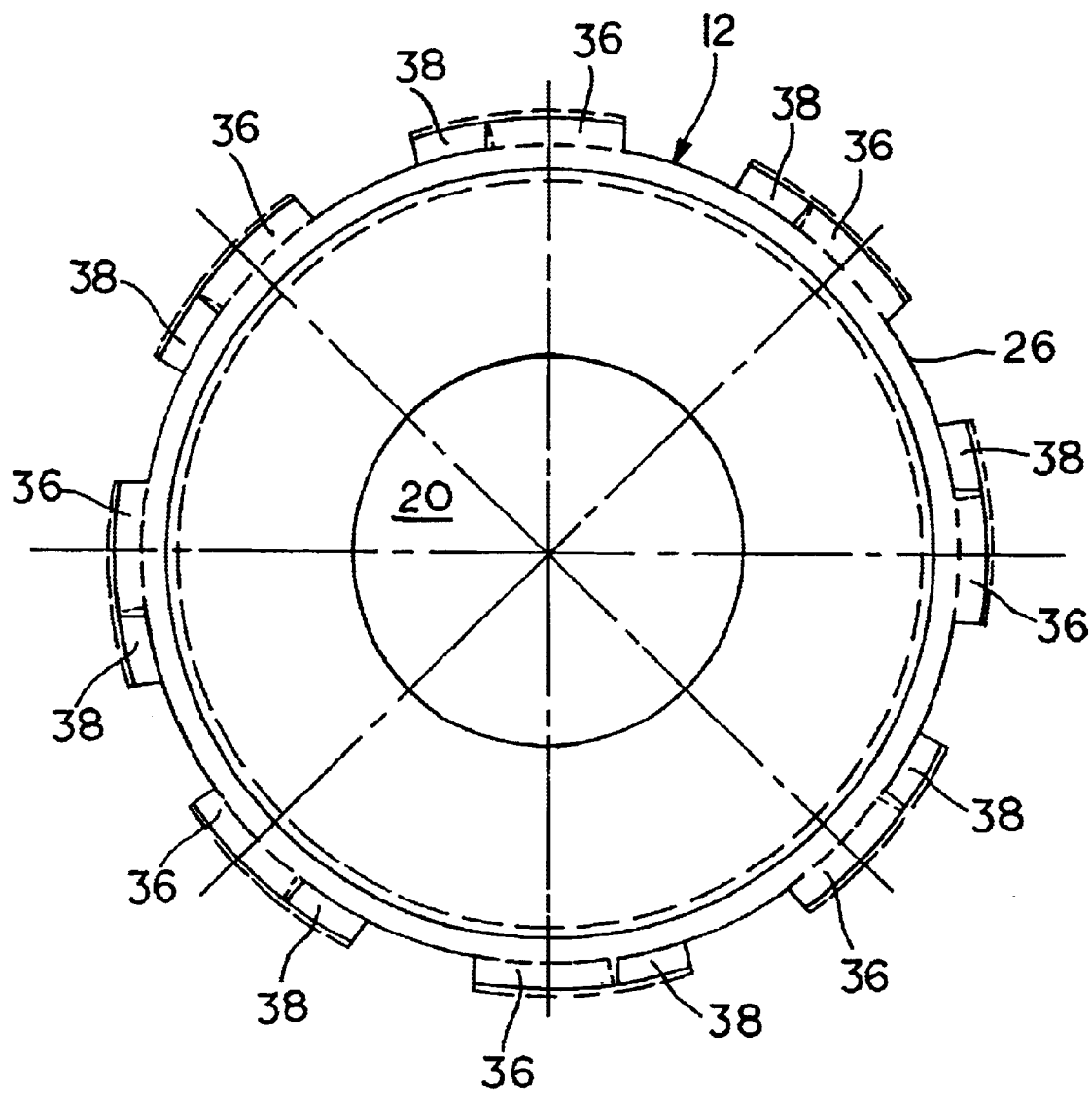
FIG. 3 is a top plan view of the filter housing.
Figure 4:
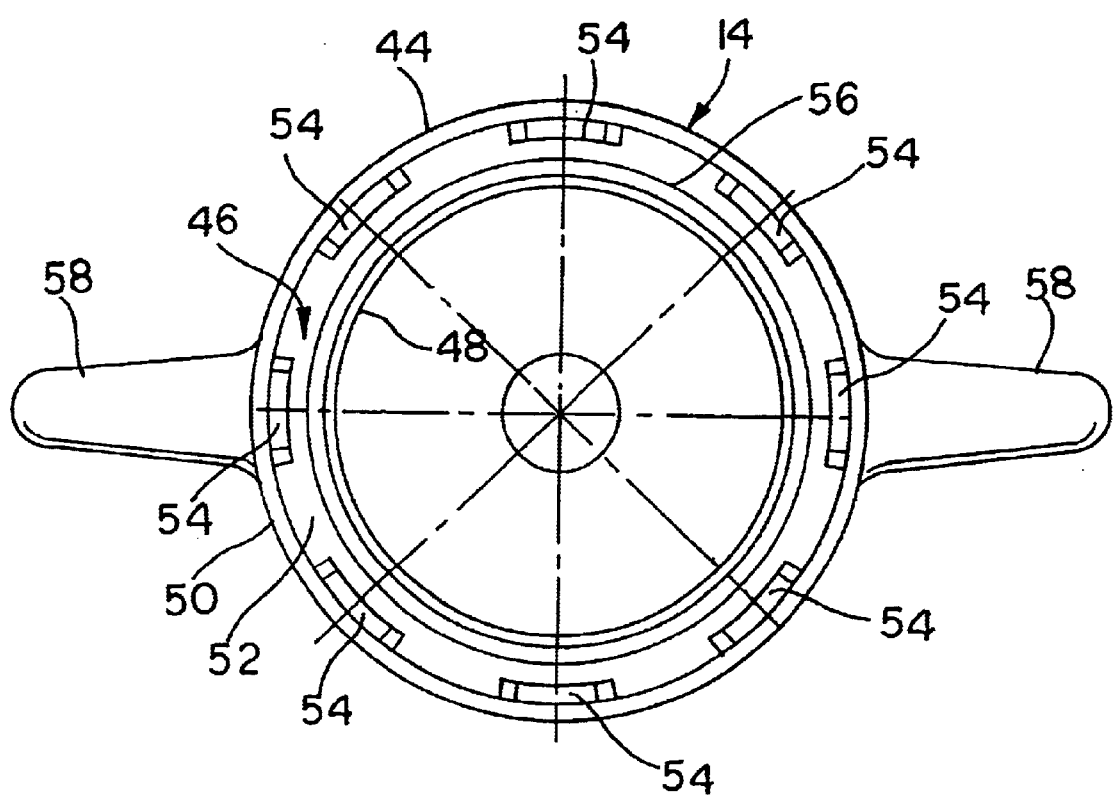
FIG. 4 is a bottom plan view of the filter lid.
Figure 5:
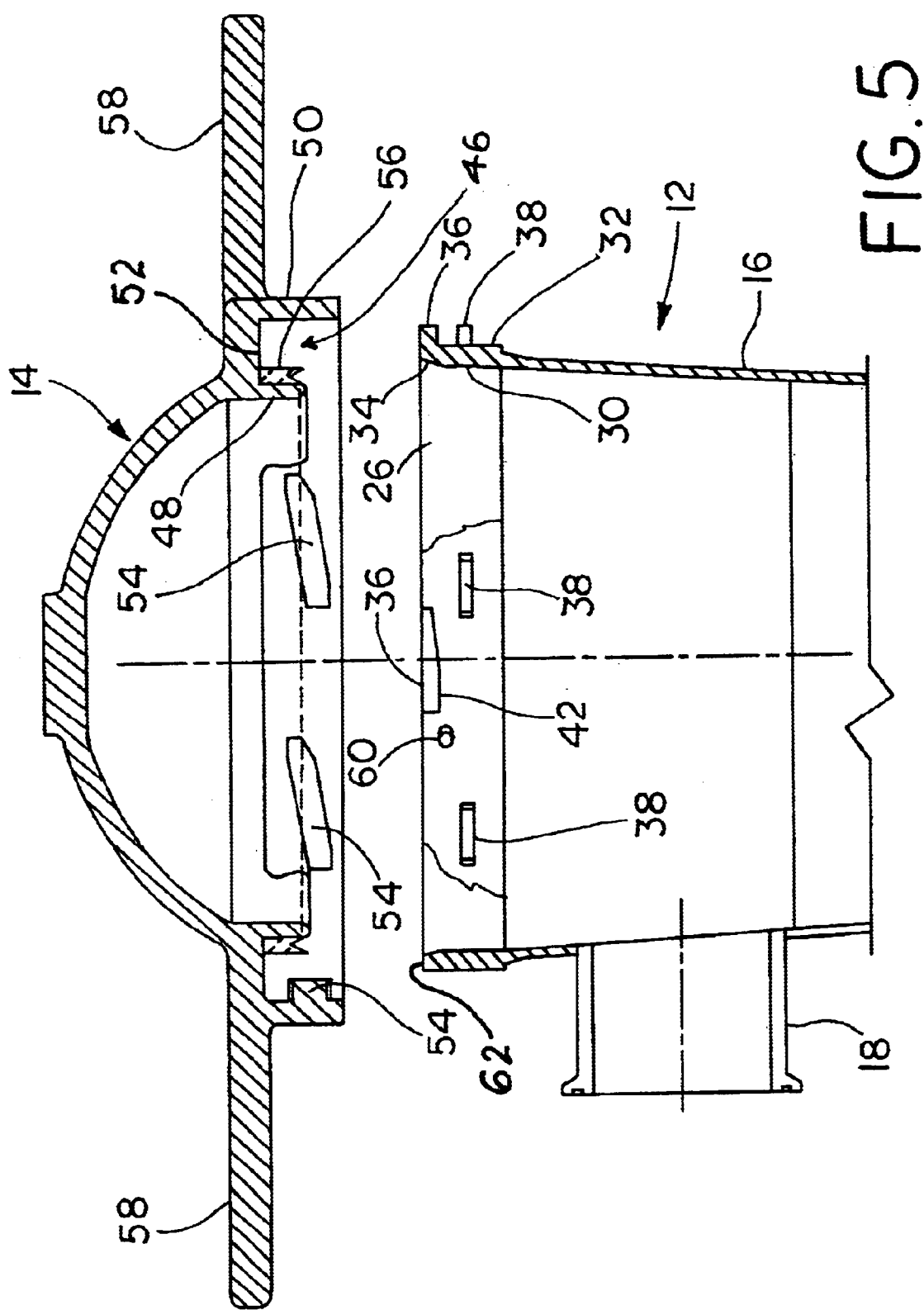
FIG. 5 is a fragmentary sectional view showing the lid separated from the filter housing.

Filter 10 of this invention includes a housing 12 and a lid 14. Housing 12 has a side wall 16 and includes an inlet port 18 and an outlet port 20 by which liquid may be introduced into and through the filter. Fitted within the filter is a basket 22 and filter bag 24 located between the inlet and outlet ports such is shown in U.S. Pat. No. 5,376,271. Liquid enters the filter through inlet port 18 and flows through bag 24 and supporting basket 22 and out outlet port 20 in a filtered condition.

Side wall 16 of housing 12 has an upper rim 26 which defines the annular opening 28 into the filter housing. Rim 26 which forms a part of the filter housing includes an inner surface 30 and an outer surface 32. Inner surface 30 is provided with an initial taper 34. The outer surface 32 includes a plurality of angularly spaced cam members 36 which extend in an equally spaced relationship about opening 28 into the filter housing. Located spaced below and slightly forward of each cam member 36 is a lug 38 which also protrudes outwardly from rim 26. Each cam member includes a tapered camming surface 40 and a notched flat 42.

Lid 14 includes an annular peripheral portion 44 which defines a downwardly open channel 46. Channel 46 is formed by an inner annular side wall 48, an outer annular sidewall 50 and a top wall 52. A plurality of angularly spaced follower members 54 are carried by the outer side wall 50, protruding into channel 46. Follower members 44 are equally spaced apart and are preferably the same in number as the camming members 36 of housing 12. An annular compressible seal 56 is carried by the lid within channel 46, protruding inwardly into the channel from inner side wall 48. Lid 14 also includes oppositely located, outwardly protruding ears 58 which enable the lid to be forcibly rotated relative to the housing into and out of its sealing relationship.

Figure 6:
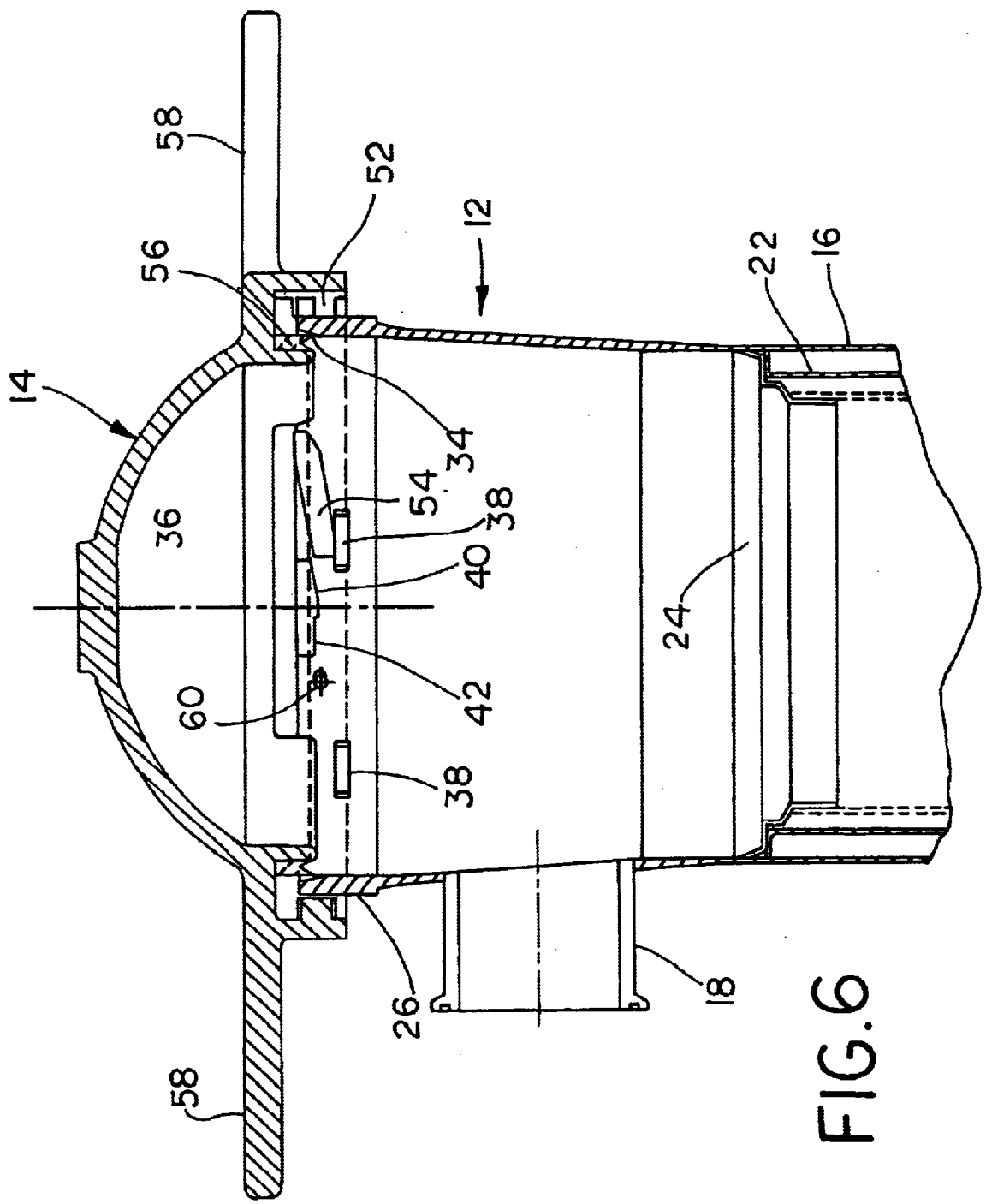
FIG. 6 is a fragmentary sectional view showing the filter lid being initially placed upon the filter housing.
Figure 7:
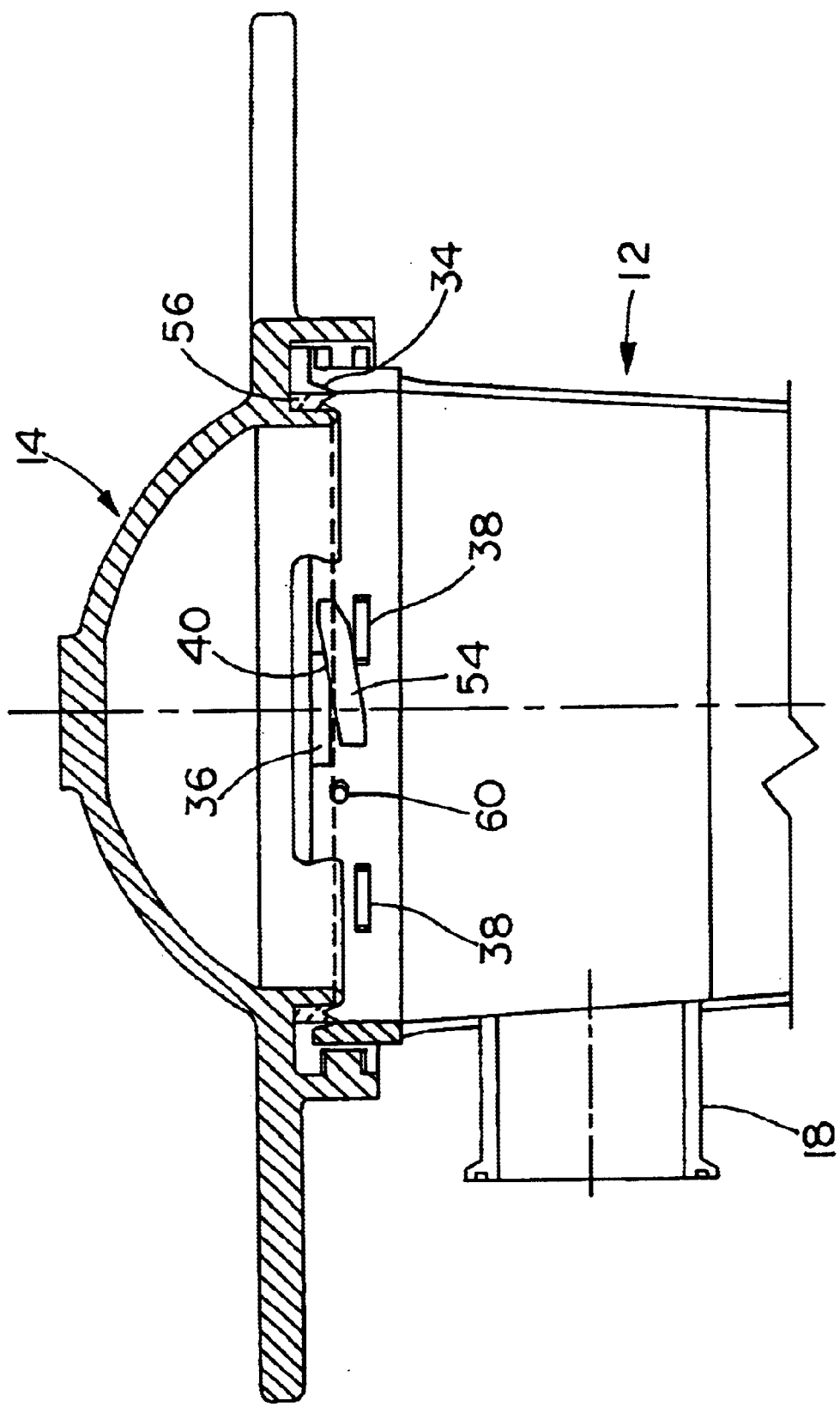
FIG. 7 is a fragmentary sectional view showing the filter lid being at an initial state of rotation upon the filter housing.
Figure 8:
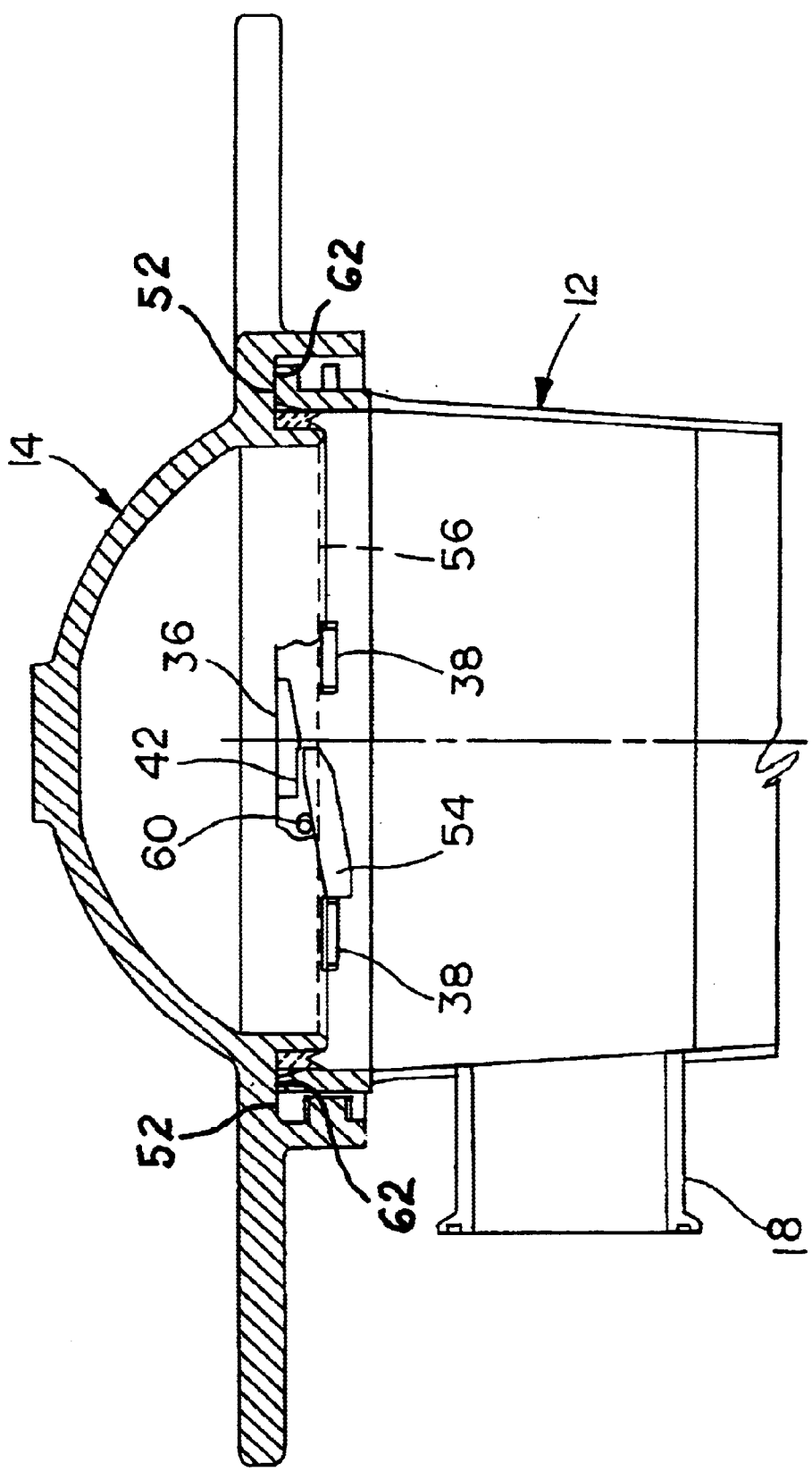
FIG. 8 is a fragmentary sectional view showing the filter lid being fully seated upon the filter housing.

To seal filter 10, lid 14 is placed over rim 26 of housing 12 with the rim extending into channel 46 in the lid, as shown in FIG. 6. Follower members 54 of the lid initially contact and rest upon lugs 38 carried by the housing with seal 56 being positioned or located at taper 34 of the housing inner surface 30 and with the follower members being located between cam members 30 of the housing and in alignment with camming surfaces 40 of the cam members. A small opening 60 is formed in housing sidewall 16 in its rim 26, preferably just at the lower level of the camming members 36. As lid 14 is rotated relative to housing 12, follower members 54 of the lid contact camming surfaces 40 of cam members 36 of the housing with continued rotation of the lid causing the lid to be drawn downwardly onto the housing with seal 36 being compressed by its following along taper 34 of the housing until it reaches uninterrupted inner surface of the housing at rim 26 where it begins to be compressed in its sealing mode, as shown in FIG. 7. As lid 14 is continued to be rotated relative to the housing, follower members 44 of the lid slide under the notched flats 42 of the camming members at which time compressed seal 56 has been drawn downwardly over the inner surface 30 of the housing to cover opening 60 in the housing side wall with at least one cam member abutting a lug 38, see FIG. 8. In this relationship, the upper face 62 of the housing about rim 26 preferably contacts top wall 52 of channel 46 in the lid. The lid is now fully seated in a sealed relationship upon the housing.

Figure 9:
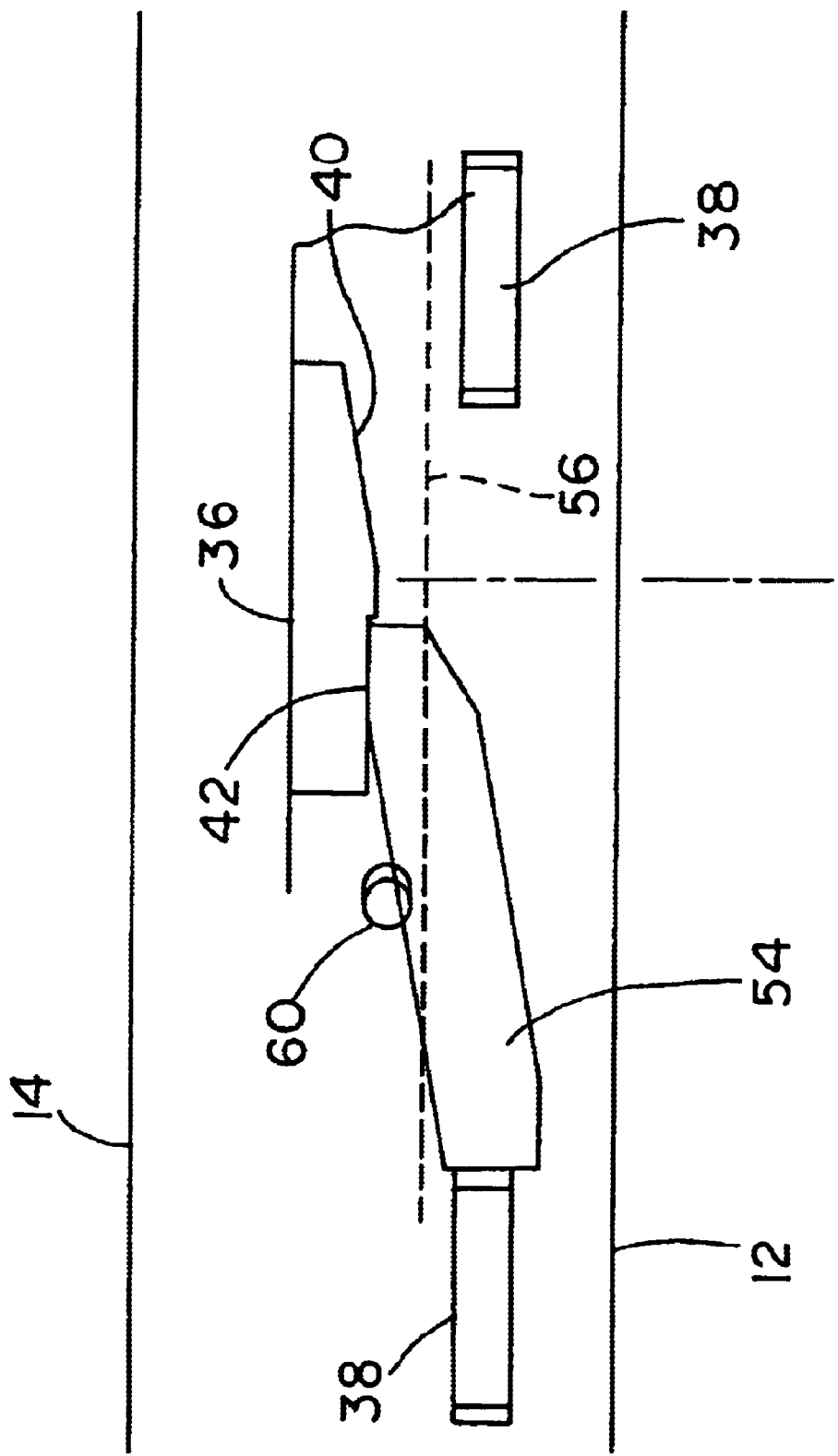
FIG. 9 is a enlarged fragmentary view showing the filter lid fully seated upon the filter housing and the filter pressurized.

If the lid is not fully seated upon housing 12, side opening 60 in the housing will not be coved by lid seal 56 so that when liquid is introduced into the filter as it is pressurized, the liquid will seep through opening 60 indicating to the user of the filter that the lid has not been fully seated and sealed. Notched flats 42 in camming members 36 provide locking detents for the follower members 54 as seen in FIG. 9 when the filter is pressurized and the lid slightly raised relative to the housing.

The invention does not to be limited to the details above given but may be modified within the scope of the amended claims.

What I claim is:

1. A liquid filter comprising a housing having an inlet port and an outlet port, said housing including a side wall having an upper rim defining an annular opening into the housing, said rim having an inner surface and an outer surface, said inner surface having an initial taper, said outer surface including a plurality of angularly spaced cam members about said opening, a lid for spanning said opening in said housing, said lid having an annular peripheral portion, a channel formed in said lid peripheral portion defined by spaced opposing inner and outer side walls, angular spaced follower members carried by said lid outer side wall protruding into said channel, an annular seal carried by said lid inner side wall protruding into said channel, a filtration element carried in said housing and positioned between said outlet port and said inlet port, said housing having a side opening in said rim adjacent one of said cam members, said lid fitted upon said housing over said housing opening with said housing rim extending into said lid channel, said seal contacting said housing inner surface at its said taper and being spaced from said housing side opening, rotation of said lid relative to said housing causing said lid follower members to contact said housing cam members to thereby urge said lid downwardly upon said housing with said seal being urged over said housing inner surface taper and into sealing engagement with said housing inner surface over said housing side opening, said lid follower member and housing cam members interlocking to secure said lid to said housing.

2. A liquid filter comprising a housing having an inlet port and an outlet port, said housing including a side wall having an upper rim defining an annular opening into the housing, said rim having an inner surface and an outer surface, said outer surface including a plurality of angularly spaced cam members about said opening, a lid for spanning said opening in said housing, said lid having an annular peripheral portion, a channel formed in said lid peripheral portion defined by spaced opposing inner and outer side walls, angular spaced follower members carried by said lid outer side wall protruding into said channel, an annular seal carried by said lid protruding into said channel, a filtration element carried in said housing and positioned between said outlet port and said inlet port, said housing having a side opening in said rim adjacent one of said cam members, said lid fitted upon said housing over said housing opening with said housing rim extending into said lid channel, said seal contacting said housing inner surface and being spaced from said housing side opening, rotation of said lid relative to said housing causing said lid follower members to contact said housing cam members to thereby urge said lid downwardly upon said housing with said seal being urged into sealing engagement with said housing inner surface over said housing side opening, said lid follower member and housing cam members engaging to secure said lid to said housing.

3. The liquid filter of claim 2 wherein each housing cam member includes a notched part, each lid follower member fitting under and into a said notched part upon pressurization of said filter.

\* \* \* \* \*